US009577702B2

(12) United States Patent
Seller

(10) Patent No.: US 9,577,702 B2
(45) Date of Patent: Feb. 21, 2017

(54) SYNCHRONIZATION APPARATUS AND METHOD

(71) Applicant: Semtech Corporation, Camarillo, CA (US)

(72) Inventor: Olivier Bernard Andre Seller, Sainte Soulle (FR)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 14/849,304

(22) Filed: Sep. 9, 2015

(65) Prior Publication Data

US 2016/0094270 A1   Mar. 31, 2016

(30) Foreign Application Priority Data

Sep. 30, 2014 (EP) .................................. 14187170

(51) Int. Cl.
*H04B 1/69* (2011.01)
*H04J 3/06* (2006.01)

(52) U.S. Cl.
CPC ............... *H04B 1/69* (2013.01); *H04J 3/0635* (2013.01); *H04J 3/0667* (2013.01); *H04B 2001/6912* (2013.01)

(58) Field of Classification Search
CPC .. H04B 1/69; H04B 2001/6912; H04J 3/0635; H04J 3/0667
USPC ........................................ 375/139, 354, 355
See application file for complete search history.

(56) References Cited

U.S. PATENT DOCUMENTS

| 6,549,562 | B1 | 4/2003 | Olaker et al. |
| 6,602,299 | B1 * | 8/2003 | Basso .............. H04N 21/23431 375/E7.01 |
| 6,614,853 | B1 | 9/2003 | Koslar et al. |
| 6,940,893 | B1 | 9/2005 | Pinkney et al. |
| 8,325,704 | B1 * | 12/2012 | Lemkin ................. H04J 3/0667 370/347 |
| 8,767,778 | B2 * | 7/2014 | Briscoe ................. H04J 3/0664 370/503 |
| 2006/0244501 | A1 * | 11/2006 | Foerster ............. G01R 13/0254 327/207 |
| 2007/0223459 | A1 | 9/2007 | Crowle et al. |
| 2013/0183905 | A1 | 7/2013 | Richardson et al. |

FOREIGN PATENT DOCUMENTS

| EP | 0 952 713 A2 | 10/1999 |
| EP | 2 449 690 A1 | 5/2012 |
| EP | 2 763 321 A1 | 8/2014 |
| EP | 2 767 847 A1 | 8/2014 |

* cited by examiner

*Primary Examiner* — Freshteh N Aghdam
(74) *Attorney, Agent, or Firm* — Blank Rome LLP

(57) ABSTRACT

A system and a method for time synchronization on a wireless network, based on the exchange of Chirp Spread Spectrum information. Time signals are broadcast from a master (40) to a plurality of slave devices (101, 102, 103). The modulation used includes a compensation of offsets in the master's system clock by symbol-wide frequency shifts that is particularly precise, fine and simple to implement. The system and method of the invention are particularly suitable for synchronizing a telecommunication cell network.

17 Claims, 4 Drawing Sheets

SYNCHRONIZATION APPARATUS AND METHOD

REFERENCE DATA

The present application claims priority from European Patent Application EP14187170 of 30 Sep. 2014, the contents whereof are hereby incorporated in their entirety.

FIELD OF THE INVENTION

The present invention relates, in embodiment, to apparatuses and methods for synchronising a plurality of clocks in a wireless network, in particular by using a chirp spread spectrum.

DESCRIPTION OF RELATED ART

Synchronization of remote clocks is a well-known topic, and has many applications. One important application is the wireless cellular networks, which require a time accuracy of at least 500 ns between the base stations. In many cases, when the network provides localization based on time difference of arrival, or other advanced services, the level of synchronization required may be considerably better than this figure. Accuracies of 10 ns or even 2 ns are customarily requested.

While digital networking represents the most widespread use of precise synchronization, many other applications require it as well. We may cite, for example, seismic measurement using a network of many physically disconnected sensors, scientific instrumentation, land surveying. This list is far from being exhaustive.

In wireless networks, signal from GPS or other geolocalization satellite systems are used to obtain a precise common reference to which all the clocks in a network can be synchronized. This requires however that the base station have roof access, and also relies on GPS signals whose availability is not guaranteed in all conditions.

For wired networks, solutions like TopSynch/IEEE 1588 or NTP can provide good accuracy, in their respective performance limits, assuming delays in the network are somewhat predictable. These solutions show some limitations for DSL links, or links that use a wireless backhaul.

Direct-sequence spread-spectrum techniques are also known and can reach very high levels of coding gain. In some cases, like in GPS system, have shown excellent noise immunity over long ranges. Limitation of these techniques are however the comparatively high complexity of the receivers, the acquisition times that can be very long for weak signals, and their power consumption.

European patent application EP2449690 describes a communication system using digitally-synthesized chirp symbols as modulation, and a suitable FFT based receiver.

Chirp generation in various kind of radiofrequency circuits is known, for example U.S. Pat. No. 6,549,562 describes a method for generating modulated chirp signal, while EP0952713 shows a synchronization process based on chirp signals.

U.S. Pat. No. 6,940,893 and U.S. Pat. No. 6,614,853, among others, describe generation and use of chirp signal by passing an impulsive signal through a dispersive filter, and communication schemes based thereupon.

Other references known in the art describe a communication system using digitally-synthesized chirp symbols as modulation, and a suitable FFT based receiver. European patent application EP2763321 describes, among others, one such modulation method in which the phase of the signal is essentially contiguous, and the chirps are embedded in data frames in such a way as to allow synchronization between the transmitter and receiver nodes, as well as determining the propagation range between them. This modulation scheme is used in the long-range LoRa™ RF technology of Semtech Corporation, and will be referred simply as 'LoRa' in the following of this document.

EP2767847 concerns a variant of the LoRa protocol that allows estimating the range between end points of a wireless link.

According to the invention, these aims are achieved by means of the object of the appended claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
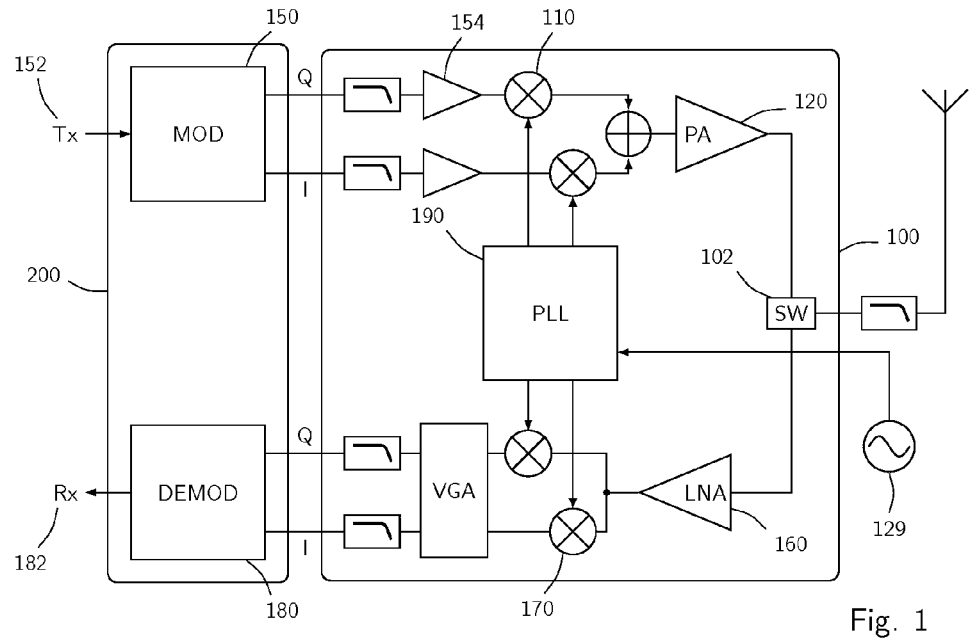
FIG. 1 shows, in schematic simplified fashion, the structure of a radio modem according to one aspect of the present invention.

Several aspects of the chirp modulation technique employed in the present invention are described in European Patent Application EP2449690, which is hereby incorporated by reference, and will be reminded here summarily. The radio transceiver that is schematically represented in FIG. 1 is a possible embodiment of the invention. The transceiver includes a baseband section 200 and a radiofrequency section 100. Concentrating on the transmitter part, the baseband modulator 150 generates, based on the digital data 152 that are present at its input, a baseband signal whose I and Q component are converted to the desired transmission frequency by the RF section 100 amplified by the power amplifier 120, and transmitted by the antenna.

The conversion of the signal from the baseband to the intended frequency is done, in this example, by mixing in mixer 110 the signal provided by amplifiers 154 with the in-phase and quadrature components of a local carrier generated by circuit 190, and linked to a reference clock 129.

Once the signal is received on the other end of the radio link, it is processed by the receiving part of the transceiver of FIG. 1 comprises a low noise amplifier 160 followed to a down-conversion stage 170 that generates a baseband signal comprising a series of chirps, that is then processed by the baseband demodulator 180, whose function is the reverse of that of the modulator 150, and provides a reconstructed digital signal 182.

As discussed in EP2449690, the modulator 150 synthesizes a baseband signal that comprises a series of chirps whose frequency changes, along a predetermined time interval, from an initial instantaneous value $f_0$ to a final instantaneous frequency $f_1$. It will be assumed, to simplify the description, that all the chirps have the same duration T, although this is not an absolute requirement for the invention.

The chirps in the baseband signal can be described by the time profile $f(t)$ of their instantaneous frequency or also by the function $\phi(t)$ defining the phase of the signal as a function of the time. Importantly, the modulator 150 can generate chirps having a plurality of different profiles, each corresponding to a symbol in a predetermined modulation alphabet.

Figure 2A:
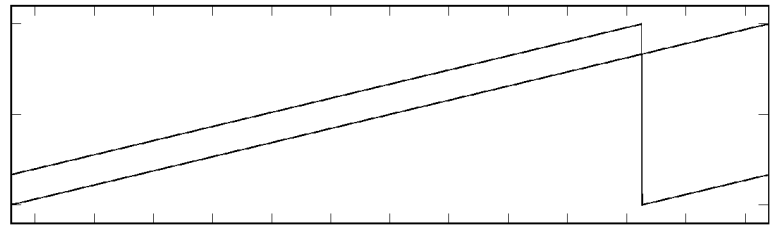
FIG. 2a plots the instantaneous frequency of a base chirp and of a modulated chirp according to one aspect of the invention. The phase of the same signals is represented in FIG. 2b, and FIG. 2c plots the real and of the complex component of the base chirp, in the time domain.
Figure 2B:
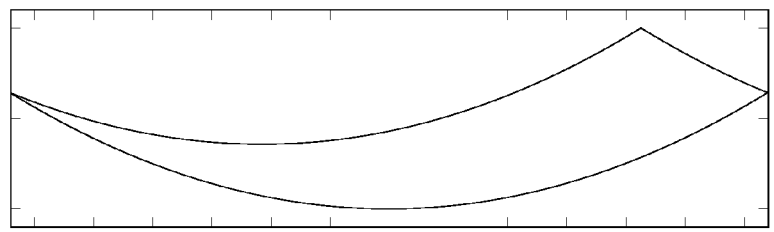

According to an important feature of the invention, the modulator 150 can generate either base chirp (also called unmodulated chirps in the following) that have specific and predefined frequency profile, or one out of a set of possible modulated chirps, obtained from base chirps by time-shifting cyclically the base frequency profile. FIG. 2a illustrates, by way of example, possible frequency and phase profiles of a base chirp and of one modulated chirps between the time instant t=$t_0$ at the beginning of a chirp and the instant t=$t_1$ at the end of the chirp, while FIG. 2b shows the corresponding baseband signals in the domain of time. The horizontal scale corresponds for example to a symbol and while the plots are represented as continuous, they will be represented by a finite number of discrete samples, in a concrete implementation. As to the vertical scales, they are normalized to the intended bandwidth or to the corresponding phase span. The phase, in particular, is represented in FIG. 2b as if it were an unbounded variable, in order to show better its continuity, but it may in fact span across several revolutions in a concrete implementation.

In the example depicted, the frequency of a base chirps increases linearly from an initial value $f_0$=−BW/2, to a final value $f_1$=BW/2, where BW stands for the amount of bandwidth spreading, but descending chirps or other chip profiles are also possible. Thus, the information is encoded in the form of chirps that have one out of a plurality of possible cyclic shifts with respect to a predetermined base chirp, each cyclic shift corresponding to a possible modulation symbol.

Figure 2C:
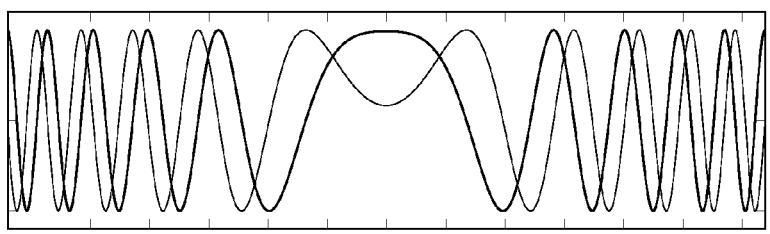

FIG. 2c is a plot of the real and imaginary component, I and Q, of the baseband signal corresponding to a base chirp, in the time domain.

Preferably, the modulator is also arranged to synthesize and insert in the signal conjugate chirps or, otherwise said, chirps that are complex-conjugate of the base unmodulated chirp. One can regard these as down-chirps, in which the frequency falls from a value of $f_0$=+BW/2 to $f_1$=−BW/2.

Preferably, the phase of the chirps is described by a continuous function $\phi(t)$, that has the same value at the beginning and at the end of a chirp: $\phi(t_0)=\phi(t_1)$. Thanks to this, the phase of the signal is continuous across symbol boundaries, a feature that will be referred to in the following as inter-symbol phase continuity. In the example shown in FIG. 2a, the function $f(t)$ is symmetrical, and the signal has inter-symbol phase continuity. As is explained in more detail by EP2449690, the structure of the signal described above allows the demodulator unit 180 in the receiver to align its time references with that of the transmitter, and the determination of the amount of cyclical shift imparted to each chirp. The operation of evaluating a time shift of a received chirp with respect to a local time reference may be referred to in the following as "dechirping", and can be carried out advantageously by multiplying the received chirp by a complex conjugate of a locally-generated base chirp, and performing a FFT. The position of the maximum of the FFT is indicative of the shift, and of the modulation value. Other manners of dechirping are however possible.

Thus, "cyclic shift value" may be used in the following to indicate the modulation in the time domain, and "modulation position", or "peak position" represents it in the frequency domain.

We note N the length of the symbol, or equivalently the spreading factor. To allow easy reception using FFT, N is preferably chosen to be a power of two. The Nyquist sampling frequency if 1/BW, and the length of a symbol is N/BW. To fix the ideas, but without limiting the invention to these specific numeric values, one can imagine that, in a possible application, BW be 1 MHz, and N equal 1024, 512, or 256. The carrier frequency may be in the 2.45 GHz IMS band. In this particular embodiment, the modulation schema of the invention could occupy the same RF band as a Bluetooth® transceiver and, possibly, reuse or share the RF parts of a Bluetooth® transceiver. The invention is not limited to this particular frequency band, however.

Hence, a modulated symbol is a cyclic shift of the base symbol, of any number between 0 and N−1. A modulation value of 0 is equivalent to the absence of modulation. Since N is a power of two, the value of the cyclic shift can be coded over $\log_2$ N bits.

Figure 3A:
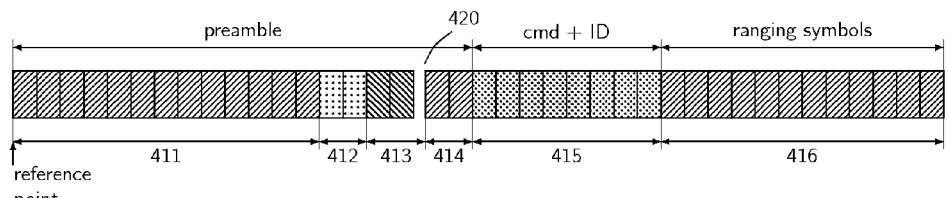
FIGS. 3a to 3c represent schematically the structure of data frames exchanged between two devices in the frame of the present invention.
Figure 3B:
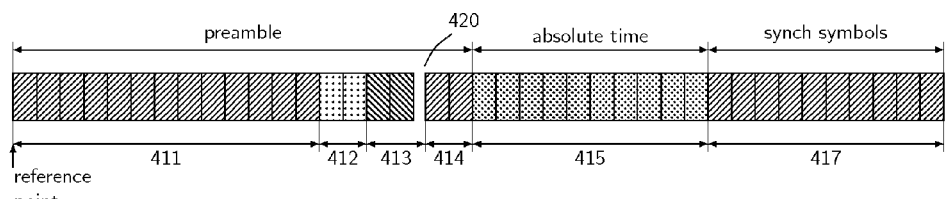
Figure 3C:
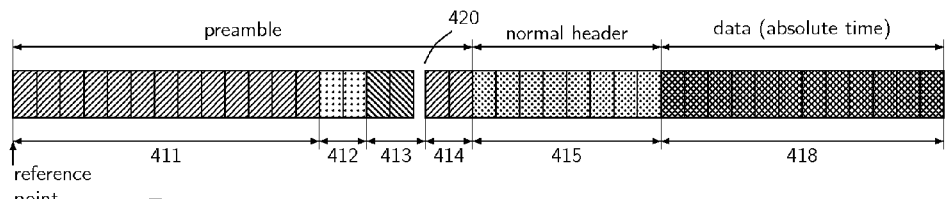

Preferably, the signal transmitted and received by the invention are organised in frames that include a preamble and a data section, suitably encoded. The preamble and the data section comprise a series of chirps modulated and/or unmodulated, that allows the receiver to time-align its time reference with that of the transmitter, retrieve an element of information, perform an action, or execute a command. In the frame of the invention, several structures are possible for the data frame, depending inter others, on the channel condition, transmitted data or command. Preferably, the frames include a preamble, whose purpose is to allow the synchronisation in time and frequency between transmitter and receiver, and a payload that expresses the transmitted data or command. FIGS. 3a to 3c represent schematically, frame structures that can be employed in various aspects of the present invention.

In the presented example, the frames in FIGS. 3a-3c have a common preamble structure that can also be in common with other frames exchanged in the system of the invention for other purposes. The preamble comprises a detect sequence 411 of base (i.e. un-modulated, or with cyclic shift equal to zero) symbols. The detect sequence 411 is used in the receiver to detect the beginning of the signal and, preferably, perform a first synchronisation of its time reference with the time reference in the transmitter. By demodulating detect sequence, for example multiplying it by a locally-synthesized conjugate chirp, and performing a FFT operation, the receiver is able to determine a shift amount and adapt the frequency and phase of its clock with those of the sender, thus allowing the decoding of the following data.

In these examples, the detect sequence 411 is followed by frame synchronisation symbols 412 that are chirps modulated with predetermined values, frequency synchronisation symbols 413 that consist in one or more, preferably two chirps that are complex-conjugate of the base unmodulated chirp, a silence 420 to allow the receiver's alignment, fine synchronisation symbols 414 that are unmodulated base chirps.

The frames 3a-3c have a reference point that corresponds, in the case of the time messages, to the instant at which the value of master time reference is latched. This reference point is indicated at the beginning of the first symbol of the preamble, by way of example, but it could also be placed at any predetermined time point in the frame, for example at the beginning of the header.

According to an aspect of the invention, transmitters and receiver nodes have preferably a communication mode that allow exchange of data by modulated chirp signals, and/or a ranging mode in which ranging exchange of signals takes place between a master device and a slave device that leads to the evaluation of the range between them. The slave is arranged for recognizing a ranging request and transmit back a ranging response containing chirps that precisely aligned in time and frequency with the chirps in the ranging requests, whereupon the master can receive the ranging response, analyse the time and frequency the chirps contained therein with respect to his own time reference and estimate a range to the slave.

FIG. 3a represents schematically a possible structure of a frame comprising a ranging request, and includes, after the preamble described above, a data field 415 that includes an indication that the frame is intended for ranging and an identification code of the specific device whose ranging is needed, and a series of ranging symbols, for example a series of identical unmodulated chirps.

Importantly, a ranging operation between two LoRa nodes involves the transmission of a ranging request from an initiator node to a determined target node, to the target node answers with a ranging reply that is transmitted after a stated interval. Importantly the target node is capable, thanks to the frequency-time equivalence of chirp-modulated signals, of aligning the phase and frequency of its own internal to those of the initiator, such that the ranging reply is aligned to the clock of the initiator node. The initiator node of a ranging request can determine the propagation delay between itself and the target node measured by its own clock, independently from what frequency shift might be present between this and the target's clock, by averaging together the results obtained by the ranging symbols 416. For more details on how this can be achieved, the reader is directed to European Patent application EP2767848, already cited in the introduction, which is hereby incorporated by reference.

Figure 4:
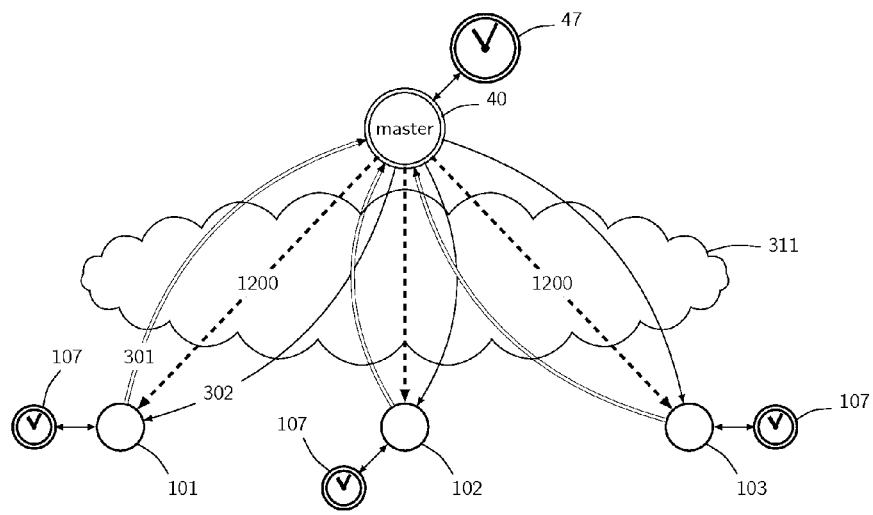
FIG. 4 shows schematically a wireless network comprising a timing master and a plurality of timing slave nodes.

According to an aspect of the present invention, the network includes a timing master 40 as shown in FIG. 4, and a plurality of timing slaves 101-103. The timing slaves can send and receive messages to and from the timing master (and also between them, but this is not essential for the invention) by sending chirp-modulated signals through a wireless radio channel 311 that can be considered as quasi-stationary, in the sense that its propagation characteristics vary only slowly with time, such that it can be assumed that they remain essentially constant during all the period needed to carry out the synchronization method of the invention. It will be assumed, to simplify the description, that the timing master and the timing slaves are stationary, but this is not an essential feature of the invention that could be used also to synchronise mobile nodes, provided the steps of the inventive method are carried out in a time short enough to allow disregarding the motion-induced range variations. It will be understood that there can be any number of timing slaves for a single timing master. Also, a timing slave can synchronize onto any number of timing masters.

The timing master includes or has access to a master time reference 47 that is preferably a GPS synchronised clock, or an atomic time standard, or any clock synchronized to a suitable reference. The timing slaves also include or have access to local time references 107. The method of the invention aims at synchronising all the local references 107 with that of the timing master such that they beat with the same pace, and give the same absolute time.

Preliminary to the synchronization, each of the timing slaves sends a ranging request 301 to the timing master and by its reply 302 determines a propagation time TOF of the signal from the master to the slave. According to the needs the estimation of TOF can be performed once, periodically, or upon determined trigger events, for example a movement. It is important to note that, contrary to the case of distance ranging, the quality of the transmission channel, and in particular multipath, play no role in the precision of the synchronization that can be attained, provided the channel can be considered essentially stationary.

After each timing slave 101-103 has estimated the TOF between the timing master 40 and itself, the timing master broadcasts (step 625) a time signal 1200 that includes the absolute time as given by the master time reference at a predetermined instant, for example at the beginning of the first symbol. Absolute time can be expressed for example as the number of nanoseconds (or fraction thereof if needed) elapsed since a predetermined epoch. If the clocks are already roughly synchronized, the absolute time could be encoded more compactly as an incremental time, for example within a day or an hour, or the least significant parts of the absolute time could be simply omitted.

The absolute time information can be encoded in the header 415 of a special timing frame, as represented in FIG. 3b, and are preferably followed by a synchronization section 417 comprising a series of unmodulated symbols, or another determined symbol sequence. In an alternative variant, the absolute time information may be encoded in the data section of a regular frame in the LoRa protocol, as shown for example in FIG. 3c. In this case the frame, after the protocol-required synchronization preamble, required by the protocol for synchronization, comprises a header 415 that identifies the frame as normal data frame, and the absolute time, possibly together with the ID of the time master in the network, or other information, encoded in the data section 418.

Timing slaves 101-103, upon receipt of time signals 1200 from the timing master 40, calculate an accurate time-stamp of the message, the time-stamp corresponds, for example, to the beginning of the first symbol in the frame and may be computed based on the offset that maximises the cross correlation between received synchronisation symbols and the locally generated reference sequence.

Since with chirp signals time and frequency offset are related together, an accurate timestamp can only be computed once frequency error is compensated for. In a possible realization of the invention, this occurs on dedicated time synchronization symbols 417 (see FIG. 3b), which are received after frequency synchronization symbols 413. Time signals encoded as the frames of FIG. 3b can be processed on a symbol-per-symbol basis to obtain a reliable timestamp, and this calculation is accessible to relatively simple nodes, using means in common with or little different from those required by the ranging function. Time stamping messages encoded in the frames of FIG. 3c is more complex, because it requires the preamble to be recorded and played back once frequency error is estimated, so as to compute timestamp on the detection symbols 411. This requires additional hardware, and may be beyond the capability of simple LoRa receivers, but would be suitable for a precise synchronization of an ensemble of base stations.

In the case of the signals of FIG. 3b, the frequency synchronization is done on two symbols only, while the same can be done on a much higher number of symbols in the case of the frames of FIG. 3c. Since any frequency error corresponds to an error in the timestamp (the proportionality coefficient being the chirp slope), the precision of the time stamping is better in the latter case than in the former. To same extent, the frequency error can be reduced by averaging several time-spaced signals.

Figure 5:
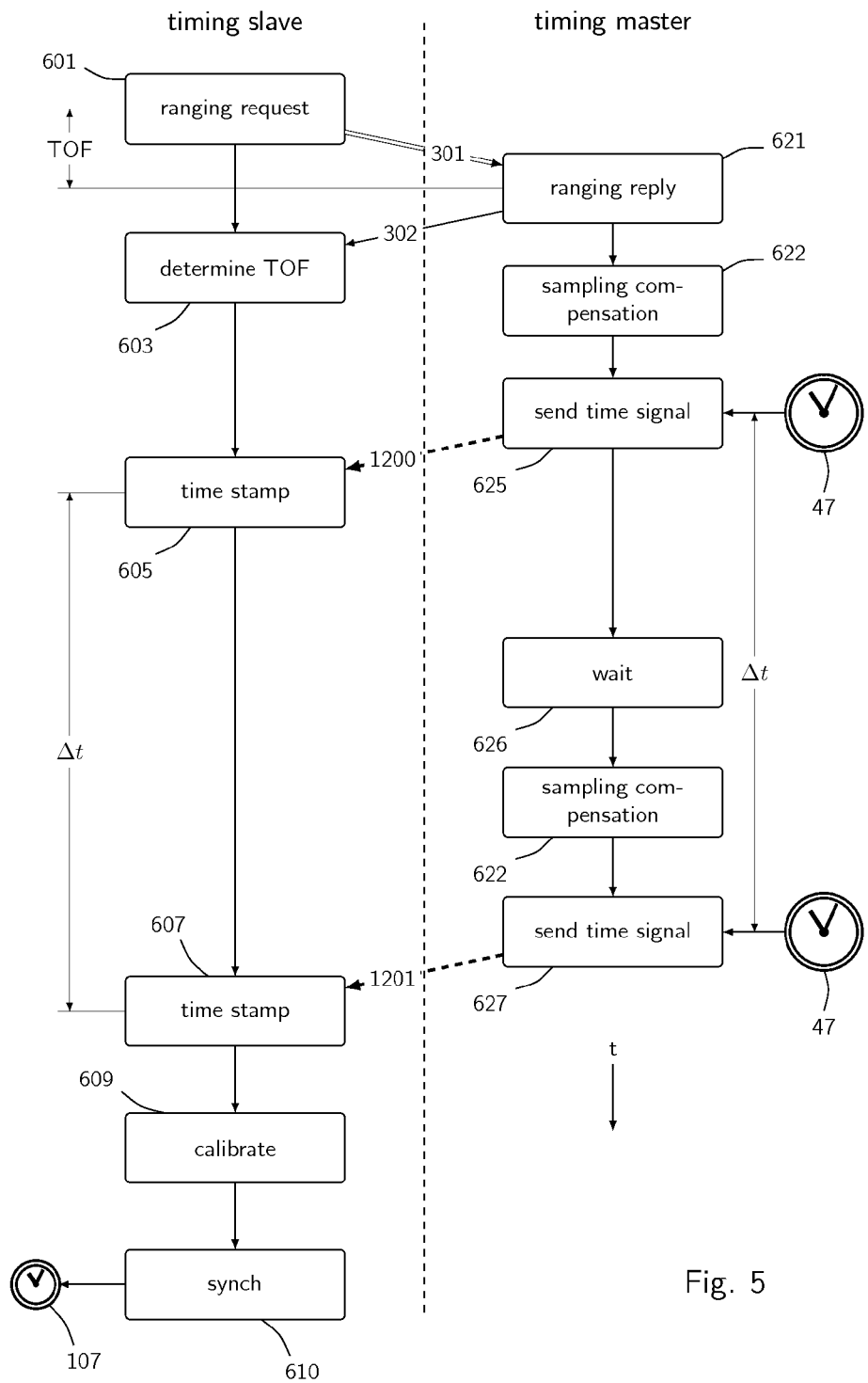
FIG. 5 illustrates the steps of a synchronization method according to one aspect of the present invention.

FIG. 5 is a simplified flowchart that illustrates a possible method of synchronizing the clock of a timing slave to that of a timing master, according to the present invention. The time flows from top to bottom in the chart: the steps performed by the timing master are shown on the right, while those performed by the timing slave are on the left. Preliminary (step 601) an, as already mentioned, the slave sends a ranging request 301 to the timing master, which replies (step 621) with the message 302 to the timing slave. Importantly, the ranging reply.

Importantly, the method of the invention consents clock synchronization with a precision that considerably exceeds the resolution of the clocks used. To make an example, the method could be used to synchronise two clocks running at a rate of 32 MHz, might be used as main clocks in LoRa modems, with a precision of 10 ns or better, despite the fact that the sampling error on the clock can be as high as 16 ns. The sampling error on the reference point of the time signal can be estimated in the timing master 40, either by high speed clocks or by other processing means. According to an aspect of the invention the sampling error is compensated in the transmission of the time signal 1200 such that the symbols are exactly aligned, when they are generated by the timing master, with the transitions of the standard clock 47. To do this, the chirp symbols are applied a fine frequency offset that is individually computed for each symbol. This correction offset is proportional to the chirp slope and to the estimated value of the sampling error. The sampling compensation is indicated as step 622 in FIG. 5.

If the time signal is encoded in a frame as in FIG. 3b, the sampling error compensation is applied only to only the synch symbols 417. In this case, the receiving timing slave can detect the preamble detection symbols 411 as usual, and then time stamps the time signal based on the boundaries of the synch symbols 417 that are compensated for the sampling error in the master clock. If on the other hand the time information is encoded in a standard frame, as in FIG. 3c, all symbols in preamble, header, and data are compensated. In the possible case in which the sampling error information is known only after the start of the modulation process, once the transmission has started, the first symbol of the preamble may be blanked, without changing the demodulation algorithm in the timing slaves 101-103.

Since the frequency offset induced by the sampling compensation are different for each symbol, the phase of the resulting signal is not strictly continuous, contrary to normal LoRa signals. This is not detrimental to the demodulation process, however, in particular if coherent demodulators are employed.

Figure 6:
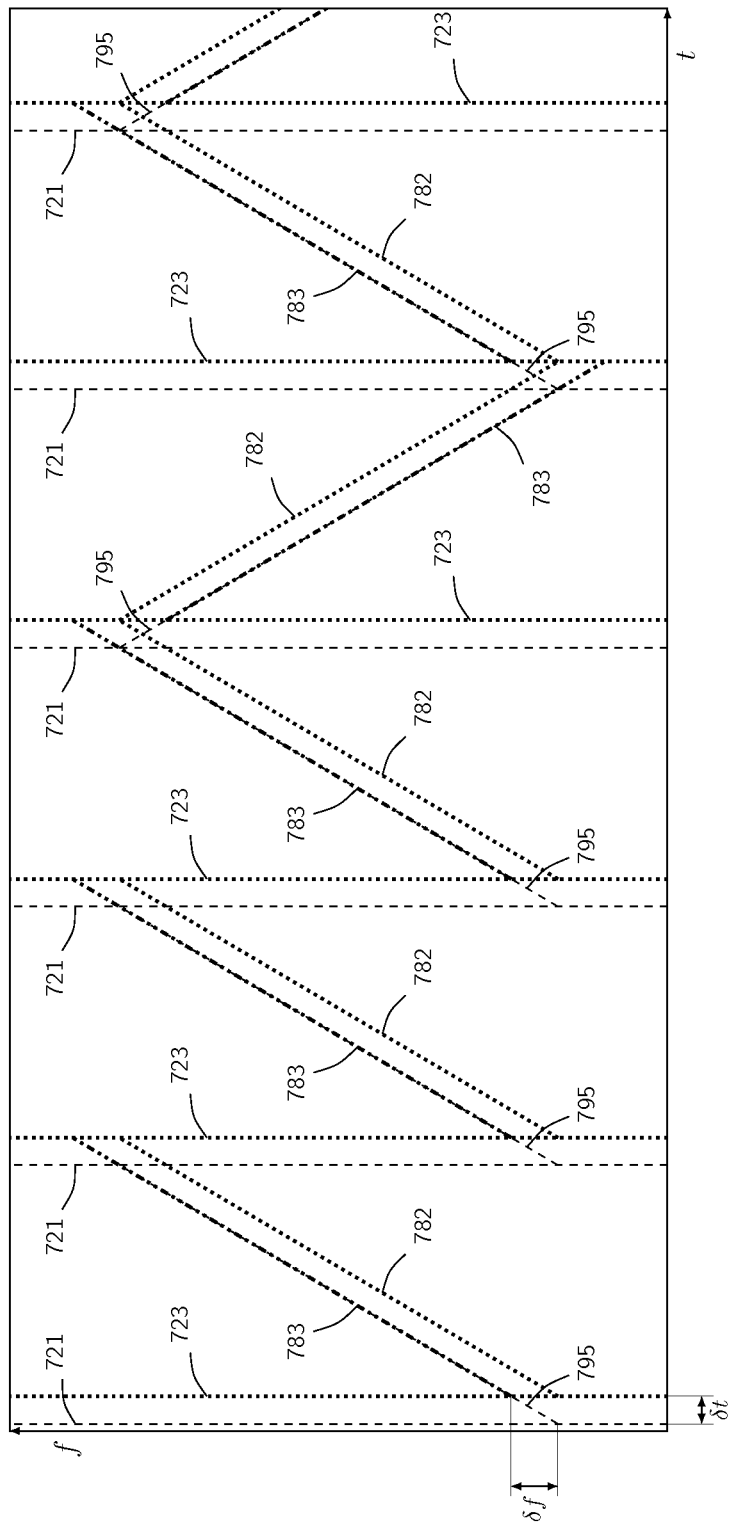
FIG. 6 illustrates a sampling error compensation according to an aspect of the invention.

FIG. 6 shows schematically a possible way of carrying out the sampling error compensation of the invention in a transmitter operating as timing master according to the invention. It is assumed that the transmitter runs a system clock that is used to synthesize the chirp signals required by the modulation. Transitions of the system clock are indicated by the dotted vertical lines 723. The transmitter includes or has access to a master time reference that provides an absolute time and to whom it is desired to synchronize the timing slaves. Transitions of the master time reference are indicated by dashed vertical lines 721. Ideally, the master time reference and the main clock should beat synchronously, and in this case the vertical lines 721 and 723 would overlap. Several factors, including drifts and differences between oscillation periods, induce however a small time offset $\delta t$ that is the source of the sampling error. The transmitter comprises appropriate means for measuring the time offset $\delta t$.

The vertical axis of the plot represents a frequency, and the plot illustrates some frequency chirps required in the LoRa protocol. In order to keep the plot simple, it includes only unmodulated up-chirps and their complex conjugate down-chirp. The compensation method would however be applicable also to modulated time-shifted chirps, and to chirps having different slopes and/or bandwidths. It is important to understand also that the offset $\delta t$ is much exaggerated, in relation with the chirp lengths, with respect to typical conditions, and that not all the clock transitions are represented. In a real case, each chirps could span across 1000 or more periods of the main clock, while the time offset $\delta t$ could amount to a fraction of period and would not be appreciable at all if represented to scale.

The dotted lines 782 represent the frequency chirps that would be synthesized without sampling error compensation. The chirps are aligned to the transitions 723 of the main clock. Perfect timing would require instead the generation of the chirps represented by lines 795 (dashed) that are aligned to the transitions 721 of the time reference. The compensation consists in computing, for each symbol/chirp, a frequency offset $\delta f$ that is equal to the sampling offset $\delta t$ times the slope of the chirp considered. One obtains then the lines 783. While the symbol boundaries are still determined by the main clock, the frequency of the chirps is the same that would be obtained without sampling error, if main clock and time reference were perfectly aligned.

This manner of compensating a fine offset between the clocks allows exceedingly fine adjustments, much better than those obtainable with time interpolation, for example, with very low complexity. It is possible thanks to the fact that in linear frequency chirps, shifts in time and frequency are equivalent.

Returning now to FIG. 5, the timing slave time-stamps the time signal 1200 upon reception, by storing in an appropriate memory area its time of arrival, measured at the frame reference point (step 605). Meanwhile, the timing master waits for a predetermined time interval $\Delta t$, for example one second, based on the indication of the master time reference 47. This interval elapsed, it sends a second time signal 1201 (step 627) that is also received and time-stamped (step 607) by the timing slave.

At this point, the timing slaves disposes of two time stamps 605 and 607 that are separated precisely by $\Delta t$. Importantly, since the time signal have been compensated for the sampling error of the transmitter's clock, the time stamps 605 and 607 have the precision of the master time reference, and the timing slave can calibrate exactly (step 609) the period of its local clock based on the knowledge of $\Delta t$ and on the difference between the two time stamps.

Once its clock period is calibrated, the timing slave can synchronize (step 610) its internal time with that of the master time reference 47 based on the absolute times encoded in the time signals 1200 and 1201 and on the previously computed TOF. Concretely, the step of synchronization can be obtained by known PLL techniques or by any other suitable means.

It is important to realize that the determination of the TOF 603 needs not precede the transmission and reception of the time signals 1200, 1201, but could also be done after or in between, provided that the timing slave has access to a reliable TOF determination at the moment when the synchronization step 610 is performed. The time signals need not be limited to two, moreover, and the timing master could well broadcast time signals in a periodic manner, all the time signal being separated by a constant predetermined interval $\Delta t = \Delta t_1 = \Delta t_2 = \ldots = \Delta t_n$, whereby the timing slaves can calibrate (609) and synchronize (610) their respective time references based on a plurality of time signals.

Optionally, the present invention uses diversity to increase the reliability of communication. This can be very useful for instance to allow operation over unlicensed bands which are subject to interference. To increase reliability, the present invention includes the step of repeating the timing synchronization technique over different frequencies, or different antennas. In this case, the timing slaves could determine an independent TOF estimation for each distinct combination of frequency, master antenna, and slave antenna, and apply to each time stamp the TOF estimation that correspond to its specific diversity combination. This additional information can be used to improve precision, or to discard inconsistent determinations. It has however the drawback of requiring more estimations and exchange of messages.

If radio spectrum occupation is a concert, as it may be the case in ISM bands, the timing slaves might also keeping a running average of all the TOF estimations without distinguishing between each possible diversity paths, possibly rejecting outliers to reduce variance, and synchronize based on an historical record of a plurality of time stamps obtained with a mix of different diversity combinations. In the approximation that multipath conditions are not too diverse, the differences of propagation among different combination will eventually average out.

In a further variation of the present invention the access to absolute time information is not public, but limited to a subset of authorized slaves. This could be obtained in various manners. According to a first possibility, the timing master limit the access to ranging services. This can be obtained by adding an authentication to the ranging exchanges. Only ranging requests that are signed by an authenticated timing slave receive an answer, so only authenticated slaves can estimate their TOF to the master to get absolute time synch.

Another possibility is to secure the synchronization distribution part. In this case, the timing master deliberately modifies the timing of time signals based on a pseudorandom sequence $\{\Delta t_1, \Delta t_2, \ldots, \Delta t_n\}$. The sequence $\{\Delta t_1, \Delta t_2, \ldots, \Delta t_n\}$ is a shared secret between the master and authorized devices (or can be determined algorithmically based on a shared secret). In this way, only authorized timing slave can calibrate their clocks with good accuracy and obtain a valid synch. Optionally, the absolute times encoded in the time messages could also be encrypted by a key known or accessible only to authorized devices. These security techniques can also be combined.

The invention claimed is:

1. A system comprising at least a timing slave device and a timing master device, wherein each timing slave device includes or has access to a time reference, wherein the timing master comprises or has access to a master time reference, wherein said timing master device and said timing slave device are operatively arranged for transmitting and receiving radio signals, characterized in that the timing master is operatively arranged for transmitting time signals to said slave device said time signals comprising a plurality of frequency chirps encoding an absolute time information derived from the time reference of the timing master, for time-stamping the time signals received from the timing master by the timing slave device and for synchronizing its time reference with the time reference of the timing master based on the time stamps, on a propagation time to the timing master, and on said frequency chirps.

2. The system of claim 1, wherein said devices have a ranging mode, allowing to determine the propagation time between the slave device and the timing master device.

3. The system of claim 1, whereby the timing master has a system clock and is operatively arranged to compensate an offset between the system clock and the master time reference by shifting the frequency of each chirp by an amount based on said offset and on a frequency slope of the chirp.

4. The system of claim 1, wherein, in the ranging mode, the at least one timing slave is arranged to send a ranging request to the timing master, wherein the timing master is arranged to reply with a ranging reply comprising frequency chirps whose frequencies and phases are aligned with the time reference of the timing slave device.

5. The system of claim 4, wherein the ranging request comprises an authentication of the timing slave device, and the timing master is arranged for replying only to ranging requests coming from authorized timing slave devices.

6. The system of claim 2, wherein the ranging is initiated by the slave, or wherein the ranging is initiated by the master who transmits the resulting propagation time to the slave.

7. The system of claim 1, wherein the time signals are broadcast signal, receivable and capable of being processed by a plurality of timing slave devices.

8. The system of claim 1, wherein said timing master is arranged for sending a plurality of time signals according to a predetermined sequence.

9. The system of claim 8, wherein said sequence is a periodic sequence or a pseudorandom sequence.

10. The system of claim 6, wherein the timing slave devices are arranged to calibrate their time references based on the timestamps of the received time signals.

11. The system of claim 1, wherein the slaves are arranged to average several time signals.

12. The system of claim 1, wherein one or more of said ranging requests, ranging reply and time signals are transmitted through a diversity of antennas at a transmitter and/or at a receiver side, or through a diversity of frequencies.

13. The system of claim 1, wherein the master timing device and the slave timing devices are part of a cellular telephone network.

14. A method of synchronizing time across a wireless radio link comprising broadcasting by a master device a plurality of time signals comprising a plurality of frequency chirps according to a predetermined time sequence, on said radio link, receiving and time stamping said time signals on said radio link by one or more slave devices, characterized in that an absolute time information is encoded in the plurality of frequency chirps.

15. The method of claim 14, wherein the frequency chirps are compensated to account for an offset relative to a master time reference by shifting the frequency of each chirp by an amount based on said offset and on a frequency slope of the chirp.

16. The method of claim 13, including calibrating a time reference of said timing slave device based on the time stamps of the received time signals.

17. The method of claim 13, comprising obtaining a propagation time from the master device to the one or more slave devices by exchanging chirp-encoded ranging messages between them.

* * * * *